United States Patent [19]
Slemmons

[11] 3,730,013
[45] May 1, 1973

[54] DYNAMICALLY BALANCED POWER TRANSMISSION

[75] Inventor: Arthur J. Slemmons, Los Gatos, Calif.

[73] Assignee: FMC Corporation, San Jose, Calif.

[22] Filed: Oct. 19, 1970

[21] Appl. No.: 81,707

Related U.S. Application Data

[62] Division of Ser. No. 849,404, Aug. 12, 1969, Pat. No. 3,578,822.

[52] U.S. Cl. ..........74/243 FC, 74/243 R, 74/573 R, 74/574, 305/57
[51] Int. Cl. .....F16h 55/30, F16f 15/22, B62d 55/08
[58] Field of Search...74/243 FC, 243 R, 573 R, 574; 305/57

[56] References Cited

UNITED STATES PATENTS

| | | | |
|---|---|---|---|
| 2,664,763 | 1/1954 | Sarazin | 74/574 |
| 3,523,463 | 8/1970 | Van Thielen | 74/243 R |
| 3,578,822 | 5/1971 | Slemmons | 74/573 X |

*Primary Examiner*—Leonard H. Gerin
*Attorney*—F. W. Anderson

[57] ABSTRACT

A rotating power transmission member engaged with a segmented power transmission means is balanced to counteract vibratory torques and forces by three tuned pendulum balance weights spaced 120° apart. A specific application is to a crawler vehicle with tuned pendulums in the track drive, bogey and idler wheel assemblies to balance and counteract vibratory forces and torques transmitted to the wheels by the track. The balance weights are built into each wheel assembly and are tuned to the same order as the number of teeth on the track drive wheel so that the balance weights produce counterforces and countertorques, per revolution, equal to those from the number of track segments, per revolution, causing the imbalance forces and torques. In the case of the idler and bogey wheels, the tuning order is the effective pitch circumference divided by the track pitch.

5 Claims, 9 Drawing Figures

PATENTED MAY 1 1973　3,730,013

INVENTOR.
ARTHUR J. SLEMMONS
BY F. W. Anderson
C. E. Tripp
ATTORNEYS

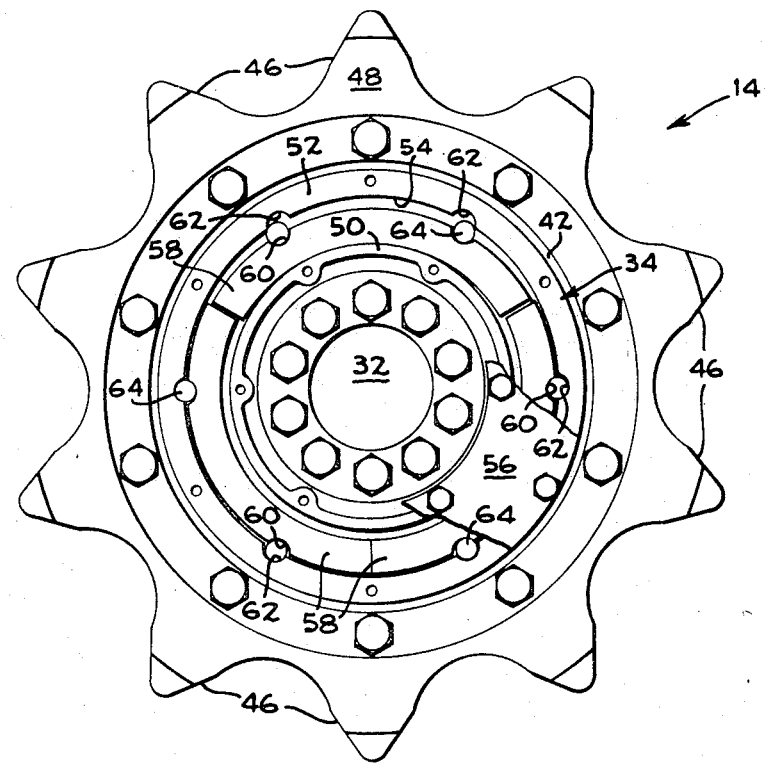
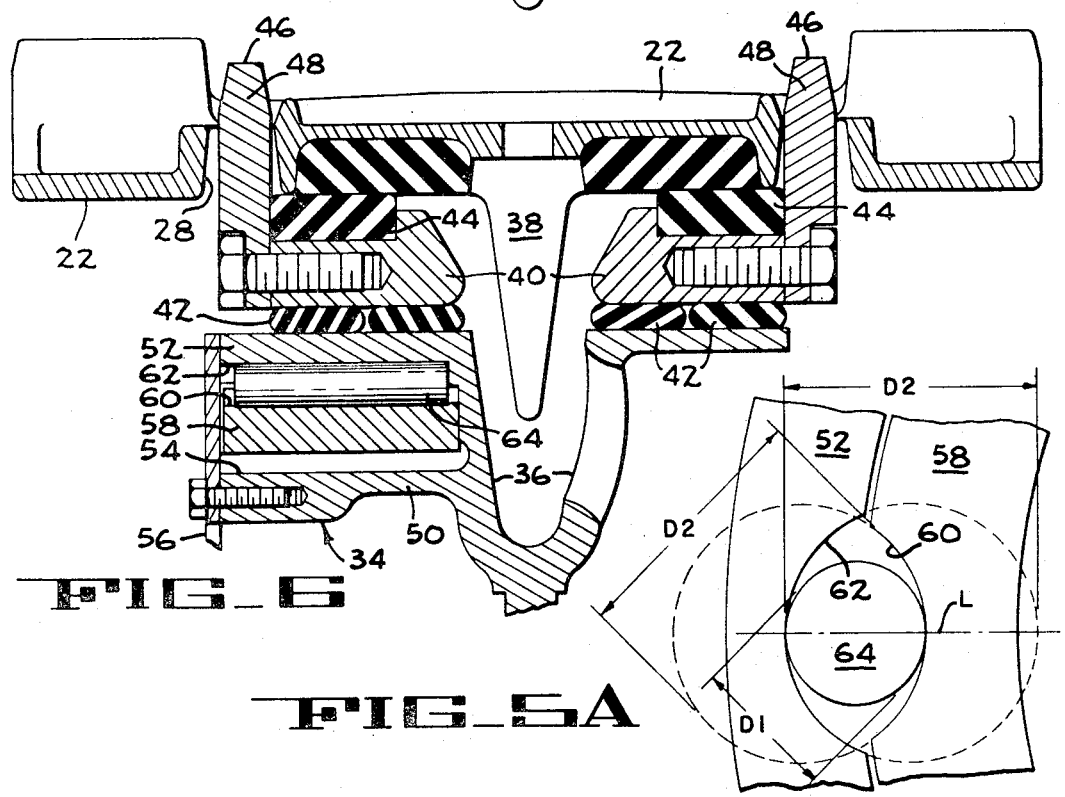

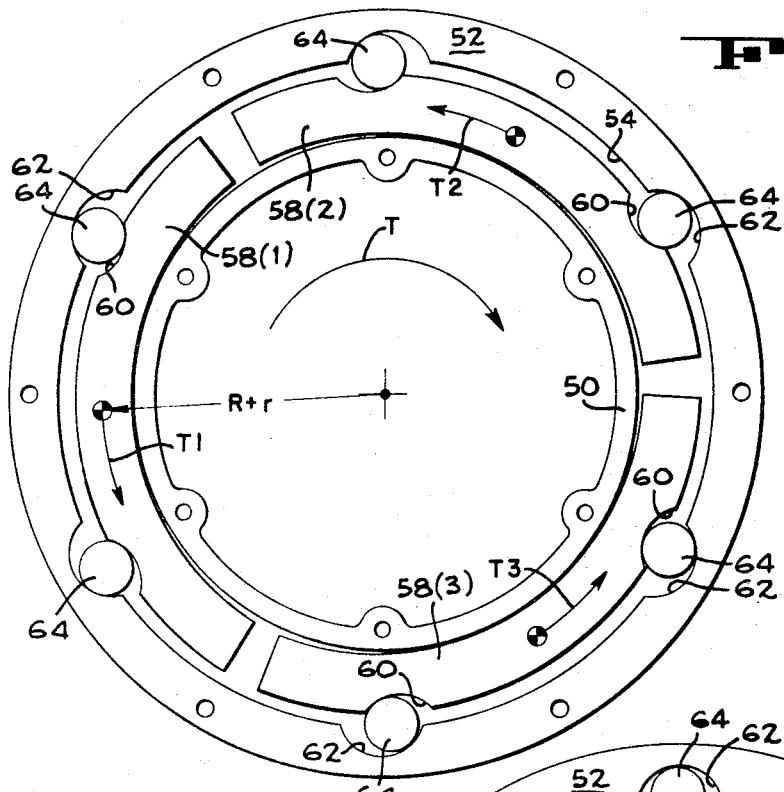
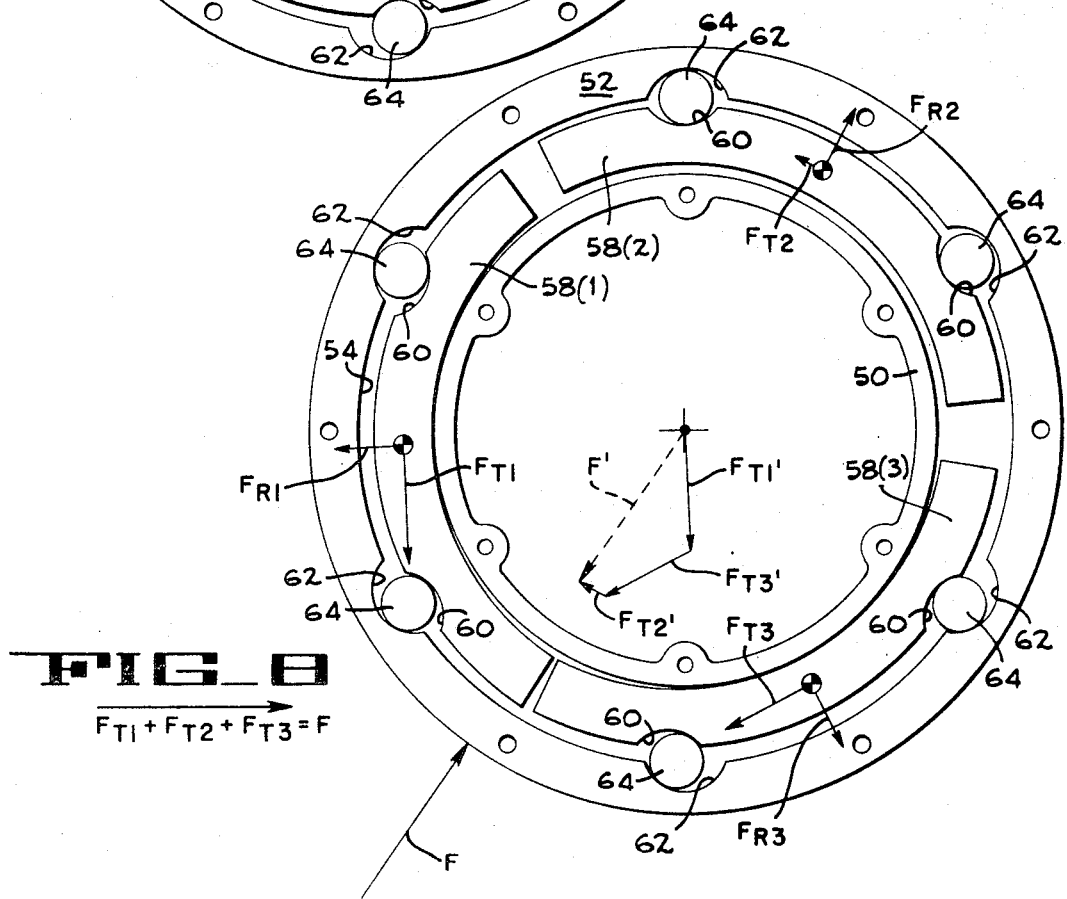

DYNAMICALLY BALANCED POWER TRANSMISSION

This is a division of application Ser. No. 849,404 filed Aug. 12, 1969, now U.S. Pat. No. 3,578,822.

BACKGROUND OF THE INVENTION

The field of the present invention pertains to dynamic balancing of drive trains of the chain and sprocket type, particularly as related to the drive sprockets, bogey wheels and idler wheels of a crawler type vehicle.

It has been established that the major source of noise-producing vibration in tracked vehicles is in the track system. The vibration causes hull panel or frame resonance and internal noise levels which are extremely uncomfortable to personnel, and which can in some instances be dangerous. Proposed solutions to the problem have included the isolation of the drive train from the track with the extensive use of rubber shock mountings, but the questionable durability and efficiency, as well as the cost, have indicated the impracticability of that solution.

Tests have shown that a large portion of the noise generated in the track system can be attributed to interaction of the track segments with the drive sprocket and with the bogey and idler wheels. The track segments are relatively wide, that is, long in the direction of their movement. Thus, the track segments cannot smoothly follow a change in direction such as occurs when they are carried around the drive sprocket, under the bogey wheels and around the idler wheel. As a result, the track segments slap against the drive sprocket, bogey wheels and idler wheel, and produce torsional vibrations and displacement of the wheels, which in turn generates both noise, vibration and wear problems. Engagement and disengagement of the sprocket teeth with the segments also produces force and torque variations on the sprocket hub.

The present invention solves the problem outlined above by providing a dynamic balance for each of the rotary members of the track system. The balancing is accomplished with centrifugal pendulum balances and eliminates torsional vibrations and lateral wheel displacement at any vehicle speed. For this purpose, and to keep within the space envelope of the rotary members in a track system, a "bifilar" type of tuned centrifugal pendulum balance has been adopted which has previously been used with reciprocating aircraft engines. The U.S. Chilton Pat. No. 2,112,984 discloses this type of pendulum balance. Further, three pendulum balances are incorporated in each drive sprocket and idler wheel assembly, spaced 120° apart, as it has been found that three balances are the least number that produce a constant symmetry of forces and can still have the necessary mass totally enclosed within the confines of the rotary member. The pendulum balances for the sprocket wheel assemblies are tuned to the order of the number of teeth on the drive sprocket, and for the other wheels are tuned to the effective pitch circumference divided by the pitch of the tracks. If the drive sprocket has 10 teeth, then ten track segments react against the sprocket per revolution, and the pendulums are tuned to swing ten times per revolution. Thus tuned, dynamic balancing of the sprocket wheels, bogey wheels or idler wheels is optimum at any speed of the vehicle and noise and wear of the tracks and wheel members is minimized.

SUMMARY OF THE INVENTION

The rotary members (drive, bogey and idler wheels) of a crawler track suspension system are individually provided with pendulum balances tuned to the number of impacts the track segments cause per revolution, in order to produce counter forces and torques effective at all speeds to attenuate the torsional vibrations and lateral displacements, and to reduce the noise and wear which would otherwise be caused by the impacts. The invention is also applicable to sprocket and chain drives because any type of chain has a comparable action on its drive and idler sprockets.

BRIEF DESCRIPTION OF THE DRAWINGS

FIG. 5 is an enlarged section taken along lines 5—5 on FIG. 3.

FIG. 5A is an enlarged fragmentary elevation of the wheel and one balance shown in FIG. 5.

FIG. 6 is an enlarged portion of the sprocket assembly shown in FIG. 3, but in a dynamic operating condition, and includes a track shoe engaged with the sprocket.

FIGS. 7 and 8 diagrammatically illustrate the balancing functions concerning torque and lateral displacement, respectively.

DESCRIPTION OF PREFERRED EMBODIMENT

Figure 1:
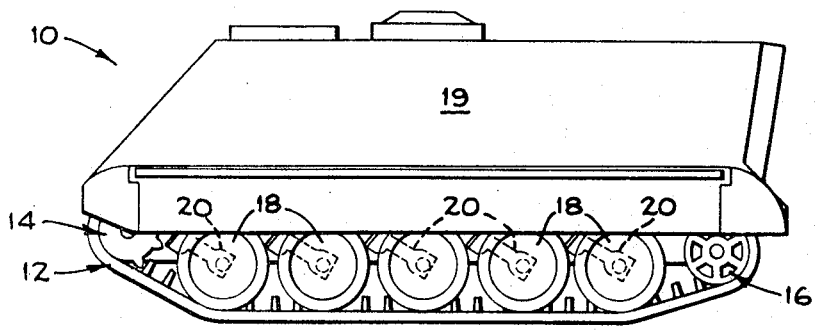
FIG. 1 is a schematic side elevation of a tracked military vehicle.
Figure 2:
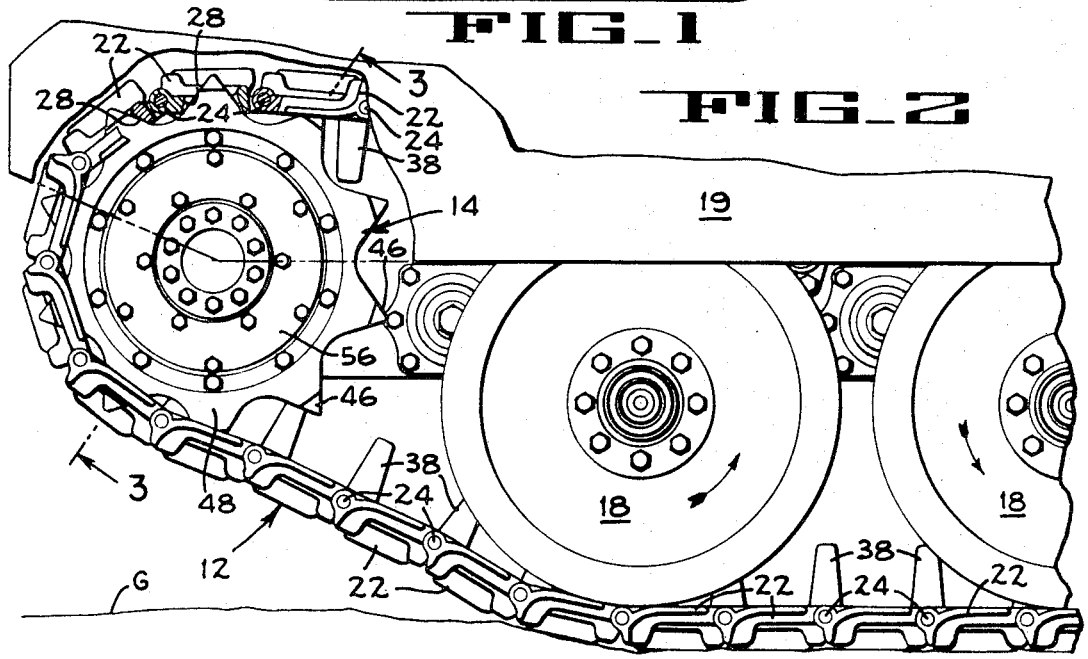
FIG. 2 is an enlarged fragmentary elevation of the leading end of the vehicle shown in FIG. 1.
Figure 4:
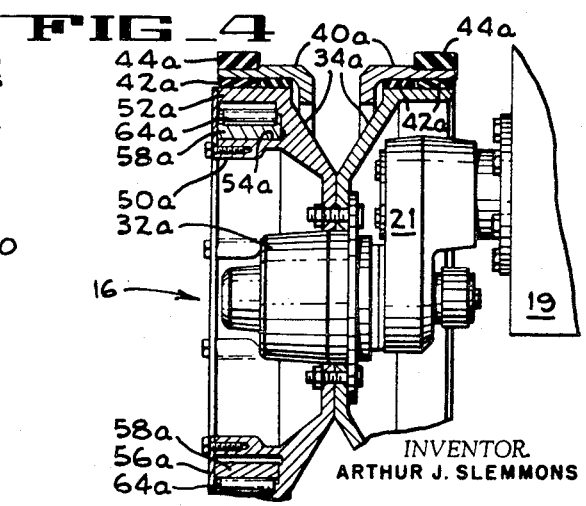
FIG. 4 is an enlarged section, similar to FIG. 3, of an idler wheel at the rear of the vehicle shown in FIG. 1.

One type of amphibious, tracked military vehicle 10 (FIG. 1) is provided at each side with an endless track 12 that is trained around a drive sprocket wheel assembly 14, an idler sprocket wheel assembly 16, and which has its lower flight engaged by bogey wheels 18 to support the hull 19. The bogey wheels are mounted on individual suspension arms 20. The drive and idler sprockets are fixed except that the idler suspension means includes a hydraulically adjusted swing arm 21 (FIG. 4) which can be moved to tension the endless track. In the usual manner, the tracks comprise a series of segments or track shoes 22 which are shown in dynamic operation in FIG. 2, and are adapted to follow the ground contour G, being pivotally interconnected by pivot pins 24.

It will be evident that the rotary motion of the drive sprockets is not truly uniform since the power originates with the power impulses of the engine and the impulses are transferred to the drive sprockets through the drive train. Noise and wear results from the relatively large pitch of the track apertures 28 (FIG. 2) and the relatively small diameter of the drive sprockets, due of course to design limitations which dictate the sizes of those elements. The result is that the track shoes 22 slap with substantial impacts against the sprockets and produce translational and torsional vibrations in the plane of the sprocket wheel assemblies. The track shoes 22 have a similar action against the idler and bogey wheels.

The torsional and lateral vibrations are transmitted to the panels of the hull 19 and thus resonate the panels and cause very high levels of noise, so much noise, in fact, that it can exceed a safe level for the personnel in the vehicle. Balancing out the vibrations in part or all of the rotary members has the desirable result of eliminating vibration and resonance in the hull. For this purpose, each sprocket, bogey and idler wheel assembly is provided with an individual centrifugal pendulum balance assembly which is tuned to the order of the number of track links impacting these elements per revolution.

As an example, if the sprockets have ten teeth, then ten track segments per revolution are moved by the sprocket. In the case of a sprocket, the tuning order is a whole number, whereas in the case of an idler or bogey wheel the tuning order will usually be other than a whole number. For instance, with a track pitch of six inches and a wheel eighteen inches in effective pitch diameter, the tuning order is 9.42 track segments per revolution, the effective pitch circumference divided by the track pitch.

Since centrifugal pendulum balances thus tuned are effective at all rotational speeds and act as a mass of infinite inertia, the torsional and lateral vibrations are removed whatever the vehicle speed may be, and the interaction of the track, sprocket wheels, bogey wheels and idler wheels produces less noise and wear than has heretofore been the case.

Figure 3:
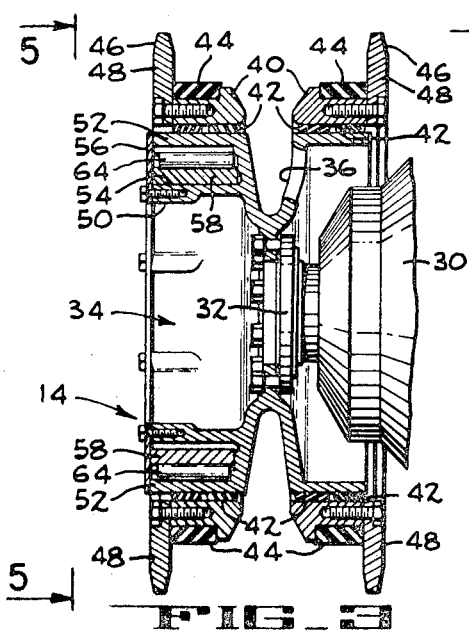
FIG. 3 is an enlarged section taken along lines 3—3 on FIG. 2.

Referring now to FIG. 3, the sprocket wheel assembly 14 is illustrated in static position. The wheel assembly is nested over a drive housing 30 and is bolted to a hub 32. The sprocket wheel assembly 14 includes a cast or fabricated wheel 34 having a peripheral groove 36 for the usual guide lugs 38 (FIG. 2) of the track shoes 22. At each side of the guide lug groove, a sprocket support ring 40 is secured to the wheel 34 by intermediate elastomeric rings 42 between the wheel and support ring. In the preferred construction, these rings are pressed in place to radially deform the elastomeric material. It has been found that elastomeric rings installed in this manner bond themselves to clean metal and will not shift under any operating conditions.

The confronting faces of the support rings define a profile approximating that of the guide lugs 38 to prevent excessive lateral drift of the track shoes, and external elastomeric rings 44 on the support rings 40 provide for cushioned contact with the track shoes 22 in the known manner. Sprocket teeth 46 are formed on annular sprockets 48 that are bolted to the exterior faces of the support rings 40. As thus far described, the sprocket wheel assembly 14 is comparable to those presently in use except for the elastomeric rings 42 which smooth and reduce the transfer of lateral and torsional vibrations between the wheel 34 and the sprockets 48.

The sprocket wheel assembly 14 (FIGS. 3 and 5) differs from present sprocket wheels by means including an outwardly projecting wall 50, which in conjunction with the rim portion 52 of the wheel 34 forms an annular recess 54. Recess 54 is sealed from the operating environment by a hub cap ring 56, and contains three pendulum balance weights 58. A liquid can be confined in the recess 54 to lubricate and damp the motions of the weights 58.

Each balance weight 58 (FIG. 5A) is provided with a pair of circumferentially spaced, outwardly open arcuate recesses 60. Each recess 60 confronts a recess 62 which is formed in the rim 52. The radii of the recesses 60 and 62 can be equal, and the surfaces defining the recesses cooperatively engage a roller 64 when the sprocket wheel assembly 14 is rotating at or above a predetermined minimum speed. When the sprocket wheel assembly is idle, as shown in FIG. 5, the balance weights 58 gravitate to rest, the upper balance weight 58 resting upon the wall 50, and the other two balance weights 58 abutting each other at bottom dead center for the particular rotative position illustrated for the sprocket wheel assembly 14.

The dimensional arrangements are such that the rollers 64 remain captive in the recesses 60 and 62, and the balance weights 58 can move endwise (circumferentially) of the wheel 34 for a limited distance when the vehicle is in motion. When sufficient vehicle speed has been reached, the balance weights are thrust outward by centrifugal force. In the present case this occurs at about 1½ miles per hour. The radius of each roller 64 is less than the radii of the recesses 60 and 62. Therefore, if the wheel rim 52 and the balance weights 58 are rotating at the same speed without imbalance, all of the recesses 60 and 62 are symmetrical relative to the roller 64 and, as shown for only one roller 64 in FIG. 5A, are symmetrical about a radial reference line L which intersects the rotational axis of the roller.

If the rotational speed (torque) of the wheel 34 changes rapidly by either acceleration or deceleration, this symmetrical relation of the roller and recesses also changes because the balance weights 58 will shift circumferentially of the wheel. The direction of shift is proportional and opposite to that in which the wheel is accelerated or decelerated. Further, in accordance with known principles concerning pendulum balances of the type shown in U.S. Pat. No. 2,112,984, the various radii and mass of the balance weights 58 can be proportioned to provide a dynamic force equal and opposite to the torsional vibration or torque induced in the wheel. The balance weights will also provide a dynamic force equal and opposite to any lateral force against the wheel, such as will occur when the wheel is vertically displaced when the torque includes a lateral force component acting on the wheel. Further, the dynamic reaction forces to torque and lateral forces acting on the wheel are arithmetically additive, that is, the mixed excitation (torque and lateral excitation) is always proportionately resisted by the balance weights so that each excitation is resisted by an equal counterforce.

It has been explained that the track shoes 22 induce torsional vibrations in the sprocket wheel assembly 14 as the shoes undergo a rapid directional change in traveling over the sprocket, and that the interaction of the track and sprocket is a major source of the hull noise, and a large factor in track and sprocket wear. Because the noise and wear at any vehicle speed results from the same number of track shoes per sprocket revolution and from the number of track segments which will equal the effective pitch circumference of a bogey or idler wheel, it is only necessary to tune the pendulum balance weights 58 to the same order, and the balancing will be effective at any vehicle speed.

The idler wheel assembly 16 (FIG. 4) is illustrated in a static position and is similar to the drive sprocket wheel assembly 14. The idler wheel assembly can be considered as representative of any of the bogey wheels 18. The assembly 16 includes elastomeric rings 44a which provide a smoothed and cushioned contact with the track shoes 22 and are mounted on support rings 40a. Each support ring is bonded by elastomeric rings 42a to the peripheral surface of a wheel segment 34a. The wheel segments are bolted to a hub 32a, and the other wheel segment is provided with an outwardly projecting wall 50a that in conjunction with the rim portion 52a forms an outwardly open annular recess 54a. A hub cap ring 56a covers the recess to protect three pendulum balance weights 58a which are similar to the pendulum balance weights 58 and function in the same manner.

Further details of the pendulum balances 58 (and 58a) are now pointed out with reference to FIGS. 7 and 8, where the balances are diagrammatically illustrated in operation.

The effective length ($r$) of the pendulum is the diametral difference between the roller 64 (D1 FIG. 5A) and a circle (D2) having a radius equal to the radius of the recesses 60 or 62. In this manner the pendulum length can be made as short as is necessary to match the order or frequency of imbalance forces, in the present example ten times per revolution of the sprocket wheel assembly 14. Thus, in accordance with known principles of tuning bifilar centrifugal pendulums for small amplitude oscillations, the length $r$ of the pendulum is derived from the equation $n^2 = R/r$ where $n$ is the order of the vibration or 10 tracks per revolution. $R + r$ (FIG. 7) is the radius to the center of gravity of the pendulum balance, and $r$ is as given above, D2 − D1. Thus $r$, when $R = 6$ inches, is only 0.060 of an inch. Considering the fact that a tuned centrifugal pendulum acts as an infinite mass for the frequency to which it is tuned, it will be appreciated that a high order of effectiveness is achieved in a simple and compact balancing mechanism. It is known in the art that slight overtuning ($n^2 < R/r$) is required to allow the use of large amplitude oscillations of the pendulums. As used in the appended claims, the term "tuned" is intended to include tuning for either small or large amplitude oscillations. Further, the term "number" in the claims is intended to include both whole numbers and portions of whole numbers, as previously explained in connection with the decimal number of segments per effective pitch circumference of the bogey and idler wheels.

As soon as the vehicle attains a speed of about 1½ miles per hour, the track engaging wheels (for the particular vehicle illustrated) are rotating at a speed sufficient to thrust and maintain the balance weights 58 radially outward. Each balance weight theoretically assumes the position illustrated in FIG. 5A if there are no unbalancing forces. It will be evident from the preceding description, however, that there are unbalancing forces as soon as the vehicle begins to move.

Assuming the theoretical FIG. 5A position for the balance weights 58 (FIG. 8) as the starting position, a lateral force F against the wheel, plus a torque T (FIG. 7) will respectively provide a reaction force and a reaction torque, the sum of the reactions being equal and opposite to the excitations. Thus, each pendulum balance weight 58 responds to the mixed excitation with a different instantaneous amplitude.

Clockwise torsional vibration or torque T (FIG. 7) will cause the pendulum balance weights 58(1), 58(2) and 58(3) to be displaced counterclockwise and produce reaction torques T1, T2 and T3. The sum of the reaction torques, in the known function of tuned centrifugal pendulums, is equal to the induced torque T at any rotational speed above that at which the pendulum balance weights begin to operate. Thus, T1 + T2 + T3 = T regardless of the speed of the wheel.

FIG. 8 illustrates the pendulum balance weights 58(1), 58(2) and 58(3) providing a restoring force to a lateral force F. The force F causes counterclockwise displacement of the balance weights 58(1) and 58(2), and clockwise displacement of the balance weight 58(3). In the known manner, this produces equal radial forces, but separate and different tangential reaction forces, the vector sum of which equals the lateral force F, as follows:

The action of a force F through the center tends to produce motion of the pendulum weights with a magnitude depending upon their spatial relation to the force. The radial forces $F_{R1}$, $F_{R2}$, $F_{R3}$ acting on the pendulums will be substantially equal because the masses are essentially on the same radius and moving with about the same tangential velocity, and are in equilibrium. The tangential forces acting on the pendulums, however, will vary according to their spatial relation to the force F.

Thus, the pendulums 58(1) and 58(3) will tend to rotate downward toward the force F, and will produce tangential force components $F_{T1}$ and $F_{T3}$. Pendulum 58(2), being spatially positioned nearly in line with the force F, will accelerate only slightly to the left and produce a smaller tangential force $F_{T2}$. The vector sum of these tangential forces, as shown at the center of the diagram for the forces $F_{T1'}$, $F_{T2'}$ and $F_{T3'}$, produce a balancing force F' equal and opposite to the excitation force F.

It will be evident that a lateral force F which is offset from the center of the wheel will also induce torque. The three pendulum balances react with amplitudes of torque reaction and force reaction which additively compensate for both components resulting from the offset force.

It will be evident, therefore, that the disclosed tuned-pendulum balanced drive sprocket, bogey wheel and idler wheel assemblies tend to reduce the transmission of lateral oscillations and torque pulses to the vehicle hull and also promote smoother movement of these rotating members. The reduced oscillations and pulses on these members results in reduced vibration and wear of the vehicle components, and substantially reduces the internal hull noise which results from resonance of the hull panels. Further, these improved results are achieved with small initial cost in a simple and durable structure requiring substantially no maintenance, yet a structure which is readily accessible for inspection or repair.

Although the best mode contemplated for carrying out the present invention has been herein shown and described, it will be apparent that modification and variation may be made without departing from what is regarded to be the subject matter of the invention.

What is claimed is:

1. Dynamic balancing apparatus comprising a rotating member, endless power transmission means engaged with said rotating member and including a plurality of pivotally interconnected segments, and a plurality of centrifugal pendulum balances mounted on said rotating member and tuned to the number of said segments engaging said rotating member each revolution.

2. Apparatus according to claim 1 wherein three pendulum balances are provided at 120 degree intervals to produce a constant symmetry of balancing forces.

3. Dynamic balancing apparatus comprising a rotating circular member, an endless segmented power transmission member engaged with said circular member and including a linear flight merging with an arcuate length trained around said circular member, said power transmission member being formed of pivotally interconnected segments which laterally impact the circular member in the linear to arcuate change of direction, and a plurality of centrifugal pendulum balances mounted on said circular member and tuned to the order of the number of lateral impacts per revolution against said circular member.

4. A dynamically balanced rotary assembly comprising a wheel having a laterally extending rim and an adjacent lateral wall defining an outwardly open annular cavity, three equally interspaced centrifugal pendulum balances mounted in said cavity, each balance mass having two outwardly open interspaced roller recesses parallel to the rotational axis of the wheel and symmetrical relative to the center of gravity of the balance, said rim defining inwardly open recesses in radial alignment one with each balance recess to form a pair of roller races for each pendulum balance, a roller captively mounted in each race, and a hub cap mounted on said rim and wall portions to isolate said balances from the operating environment.

5. A dynamically balanced rotary assembly comprising a rotating member having a laterally extending rim, three equally interspaced centrifugal pendulum balances rotating with said member, each balance mass having outwardly open interspaced roller recesses parallel to the rotational axis of the wheel and symmetrical relative to the center of gravity of the balance, said rim defining inwardly open recesses in radial alignment one with each balance recess to form roller races for each pendulum balance, and a roller captively mounted in each race.

* * * * *

UNITED STATES PATENT OFFICE
CERTIFICATE OF CORRECTION

Patent No. 3,730,013　　　　　　　　　Dated May 1, 1973

Inventor(s) Arthur J. Slemmons

It is certified that error appears in the above-identified patent and that said Letters Patent are hereby corrected as shown below:

Column 2, lines 10-13, should read:
--which would otherwise be caused by the impacts. This divisional application particularly concerns the application of the invention to a chain and sprocket type of drive train to substantially reduce or eliminate torsional vibrations and lateral displacements caused by interaction of the drive members.--.

Column 6, the following paragraph should appear between lines 60 and 61:
--While the invention has been described in conjunction with a vehicle having crawler tracks, it is believed evident that the principles are also broadly applicable to chain and sprocket drive trains of other types to reduce noise, wear, vibration and to achieve the other improved results noted.--.

Signed and sealed this 5th day of February 1974.

(SEAL)
Attest:

EDWARD M. FLETCHER, JR.
Attesting Officer

RENE D. TEGTMEYER
Acting Commissioner of Patents.